US009134448B2

(12) United States Patent
Seydoux et al.

(10) Patent No.: US 9,134,448 B2
(45) Date of Patent: Sep. 15, 2015

(54) METHODS FOR CHARACTERIZATION OF FORMATIONS, NAVIGATING DRILL PATHS, AND PLACING WELLS IN EARTH BOREHOLES

(75) Inventors: Jean Seydoux, Ipanema (BR); Yuk Ha Chow, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 351 days.

(21) Appl. No.: 13/502,542

(22) PCT Filed: Oct. 15, 2010

(86) PCT No.: PCT/US2010/052853
§ 371 (c)(1),
(2), (4) Date: Aug. 7, 2012

(87) PCT Pub. No.: WO2011/049828
PCT Pub. Date: Apr. 28, 2011

(65) Prior Publication Data
US 2012/0298420 A1    Nov. 29, 2012

Related U.S. Application Data

(60) Provisional application No. 61/253,248, filed on Oct. 20, 2009.

(51) Int. Cl.
*E21B 7/06*          (2006.01)
*G01V 3/20*         (2006.01)
(Continued)

(52) U.S. Cl.
CPC ... *G01V 3/20* (2013.01); *E21B 7/06* (2013.01); *E21B 47/02* (2013.01); *E21B 47/026* (2013.01)

(58) Field of Classification Search
USPC .................. 175/26, 40; 702/9, 11
See application file for complete search history.

(56) References Cited

U.S. PATENT DOCUMENTS

| 4,899,112 A | 2/1990 | Clark et al. |
| 5,113,953 A | 5/1992 | Noble |

(Continued)

FOREIGN PATENT DOCUMENTS

| CN | 1648408 A | 8/2005 |
| WO | 2008144710 A1 | 11/2008 |

(Continued)

OTHER PUBLICATIONS

Notification of the First Office Action and the Search Report for Chinese Application No. 201080058477.5 dated Apr. 17, 2014.

(Continued)

*Primary Examiner* — William P Neuder
(74) *Attorney, Agent, or Firm* — John Vereb; Kimberly Ballew

(57) ABSTRACT

A method for directing borehole drilling in a target earth formation includes the following steps: providing drilling equipment having a bottom hole assembly that includes a controllable directional drilling subsystem, and a logging-while-drilling directional measurement tool with a look-around and look-ahead capability; determining the presence of a predetermined type of formation characteristic in the target formation; and navigating a drill path in the target formation with the drilling equipment, including receiving measurement signals from the directional measurement tool, obtaining, from the received measurement signals, indications of formation parameters with respect to the formation characteristic in the target formation, and controlling the directional drilling subsystem to drill in a direction determined as a function of the obtained indication of formation parameters.

20 Claims, 14 Drawing Sheets

(51) Int. Cl.
*E21B 47/02* (2006.01)
*E21B 47/026* (2006.01)

(56) References Cited

U.S. PATENT DOCUMENTS

| | | |
|---|---|---|
| 5,265,682 A | 11/1993 | Russell et al. |
| 5,473,158 A | 12/1995 | Holenka et al. |
| 5,520,255 A | 5/1996 | Barr et al. |
| 5,553,678 A | 9/1996 | Barr et al. |
| 5,553,679 A | 9/1996 | Thorp |
| 5,582,259 A | 12/1996 | Barr |
| 5,603,385 A | 2/1997 | Colebrook |
| 5,673,763 A | 10/1997 | Thorp |
| 5,685,379 A | 11/1997 | Barr et al. |
| 5,695,015 A | 12/1997 | Barr et al. |
| 5,706,905 A | 1/1998 | Barr |
| 5,778,992 A | 7/1998 | Fuller |
| 5,803,185 A | 9/1998 | Barr et al. |
| 5,812,068 A * | 9/1998 | Wisler et al. .............. 340/855.5 |
| 5,971,085 A | 10/1999 | Colebrook |
| 6,019,180 A | 2/2000 | Pafitis et al. |
| 6,089,332 A | 7/2000 | Barr et al. |
| 6,092,610 A | 7/2000 | Kosmala et al. |
| 6,158,529 A | 12/2000 | Dorel |
| 6,188,222 B1 | 2/2001 | Seydoux et al. |
| 6,244,361 B1 | 6/2001 | Comeau et al. |
| 6,272,434 B1 * | 8/2001 | Wisler et al. .................... 702/9 |
| 6,364,034 B1 | 4/2002 | Schoeffler |
| 6,394,193 B1 | 5/2002 | Askew |
| 6,419,014 B1 | 7/2002 | Meek et al. |
| 6,438,495 B1 | 8/2002 | Chau et al. |
| 6,968,909 B2 | 11/2005 | Aldred et al. |
| 7,040,415 B2 | 5/2006 | Boyle et al. |
| 7,093,672 B2 | 8/2006 | Seydoux et al. |
| 7,366,616 B2 | 4/2008 | Bennett et al. |
| 7,559,379 B2 | 7/2009 | Hall et al. |
| 7,600,586 B2 | 10/2009 | Hall et al. |
| 7,610,970 B2 | 11/2009 | Sihler et al. |
| 7,612,565 B2 | 11/2009 | Seydoux et al. |
| 7,656,160 B2 | 2/2010 | Legendre et al. |
| 7,779,933 B2 | 8/2010 | Sihler et al. |
| 7,798,246 B2 | 9/2010 | Collins et al. |
| 2001/0052428 A1 | 12/2001 | Larronde et al. |
| 2002/0011359 A1 | 1/2002 | Webb et al. |
| 2003/0184302 A1 | 10/2003 | Omeragic et al. |
| 2006/0011385 A1 | 1/2006 | Seydoux et al. |
| 2007/0030167 A1 | 2/2007 | Li et al. |
| 2008/0136419 A1 | 6/2008 | Seydoux et al. |
| 2008/0236270 A1 | 10/2008 | Denichou et al. |
| 2009/0173493 A1 | 7/2009 | Hutin et al. |
| 2010/0116550 A1 | 5/2010 | Hutin et al. |

FOREIGN PATENT DOCUMENTS

| | | |
|---|---|---|
| WO | 2009/029517 A2 | 3/2009 |
| WO | 2010043951 A2 | 4/2010 |
| WO | 2010043951 A3 | 7/2010 |

OTHER PUBLICATIONS

International Search Report and Written Opinion issued in PCT/US2010/052853 on May 30, 2011, 9 pages.
L. Chou, et al. "Steering Toward Enhanced Production," Oilfield Review, Autumn 2005 issue, pp. 54-63.
Examination Report issued in Australian Patent Application No. 2010310816 on Nov. 27, 2014, 3 pages.
Second Office Action issued in Chinese Patent Application No. 201080058477.5 on Nov. 18, 2014, 14 pages.
Examination Report issued in Gulf Corporation Application No. 2010-16921 on Dec. 16, 2014, 4 pages.
First Office Action issued in Mexican Application No. MX/A/2012/004590 on May 23, 2013, 3 pages.
Second Office Action issued in Mexican Application No. MX/A/2012/004590 on Oct. 7, 2013, 3 pages.
Decision on Grant issued in Russian Application No. 2012120743 on Sep. 12, 2014, 20 pages.
Office Action issued in Russian Application No. 2012120743 on Nov. 11, 2013, 9 pages.

* cited by examiner

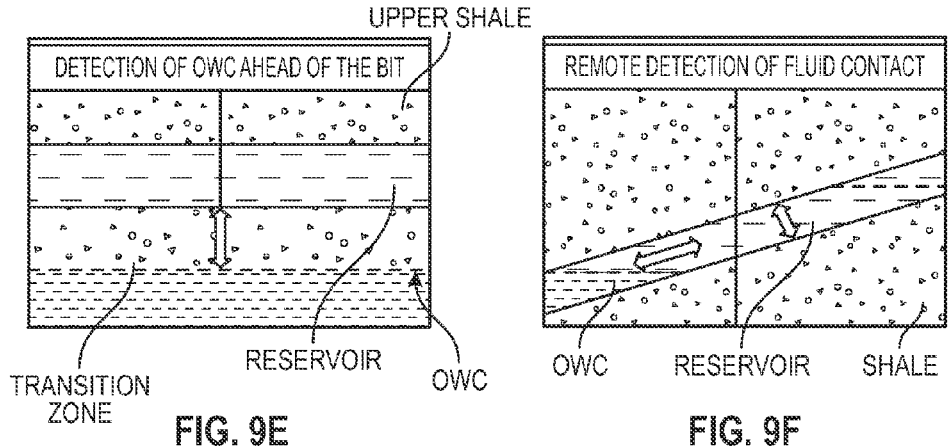
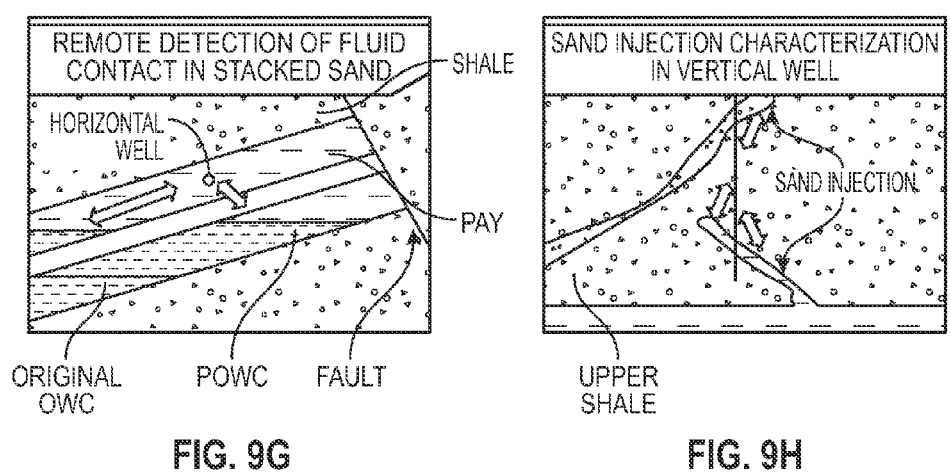
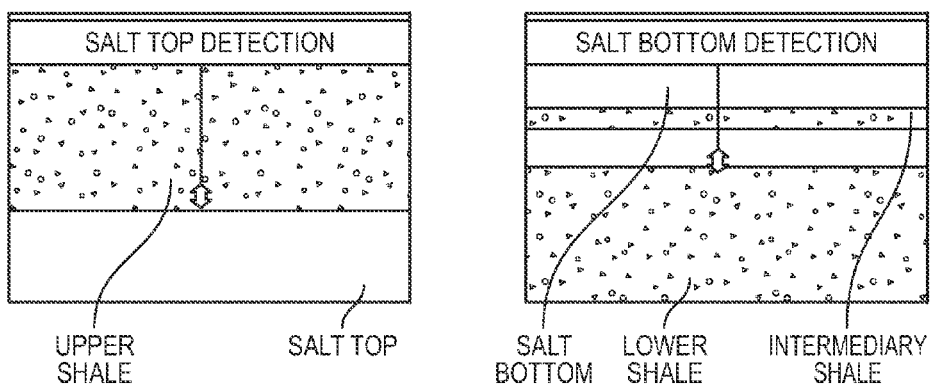

METHODS FOR CHARACTERIZATION OF FORMATIONS, NAVIGATING DRILL PATHS, AND PLACING WELLS IN EARTH BOREHOLES

PRIORITY CLAIM

Priority is claimed from U.S. Provisional Patent Application No. 61/253,248, filed Oct. 20, 2009 which is incorporated herein by reference.

FIELD OF THE INVENTION

This invention relates to the field of drilling and measuring in earth boreholes and, more particularly, to methods for characterizing target earth formations and for accurately placing wells, such as during directional drilling of boreholes.

BACKGROUND OF THE INVENTION

The advent of directional drilling, and of logging while drilling ("LWD") and measurement while drilling ("MWD"), have profoundly improved the locating and placement of wells for production of hydrocarbon resources. Directional drilling involves the drilling of a well bore along a deviated course for various purposes, including bottoming out in a particular target region. Directional drilling is employed, for example, to obtain an appropriate well bore trajectory into an oil producing formation bed (or "pay zone") and then drill substantially within the pay zone. A horizontally drilled well can greatly increase the borehole volume in the pay zone with attendant increase in oil production.

LWD usually refers to measurement of formation properties with instruments that are located in the drill collars immediately above the drill bit. Measurements are made shortly after the hole is cut and before it is adversely affected by continued drilling or coring operations. Fluid invasion into the borehole wall is also reduced relative to wireline logging because of the shorter time between drilling and measurement. LWD and MWD are sometimes distinguished in that whereas LWD data are recorded in memory and downloaded when the tools reach the surface, MWD data are transmitted to the surface (e.g. by mud pulse or wired drill pipe) and monitored in real time. However, the term LWD is also used more generically to cover both LWD and MWD, and will be used in that manner herein, unless otherwise indicated.

Before a directional drilling well plan is devised, the drilling team will often have significant a priori knowledge of geological attributes of the local formations. Initial knowledge may be derived, for example, from survey and/or producing wells in the local area. Seismic surveys are commonly used in locating the well path in the formation, due to its ability to probe far into the formation. However, seismic surveys are generally incapable of providing the desired resolution and accuracy to sufficiently characterize a target formation and predict location for advantageous well placement.

Other measurements, such as resistivity measurements, are often made with electromagnetic (EM) tools. Some EM logging tools use propagation techniques to measure the resistivity of the formation. A propagation tool measures the amplitudes, phase shifts, and attenuation of EM signals in the formation to determine the resistivity of the formation, which can be an important aspect of its characterization.

A resistivity tool that provides a relatively deep reading is disclosed in U.S. Pat. No. 6,188,222 assigned to the assignee of the present invention. This tool, which can be part of an LWD tool array, includes a relatively long spacing between the transmitter and the receiver, and can be used to determine formation resistivity and to obtain indications of formation boundaries for determining well location during directional drilling. Subsequent developments, in LWD tools, some of which are summarized hereinbelow, have improved the accuracy of controlled directional drilling and have facilitated well placement. However, there is still much room for improvement of these functions, and of the characterization of target earth formations and their reservoirs, and it is among the objectives hereof to achieve such improvement.

SUMMARY OF THE INVENTION

In accordance with a form of the invention, a method is set forth for directing borehole drilling in a target earth formation, including the following steps: providing drilling equipment having a bottom hole assembly that includes a controllable directional drilling subsystem, and a logging-while-drilling directional measurement tool with a look-around and look-ahead capability; determining the presence of a predetermined type of formation characteristic in the target formation; and navigating a drill path in the target formation with said drilling equipment, including receiving measurement signals from said directional measurement tool, obtaining, from the received measurement signals, indications of formation parameters with respect to said formation characteristic in the target formation, and controlling said directional drilling subsystem to drill in a direction determined as a function of said obtained indication of formation parameters. In an embodiment of this form of the invention, the step of providing a logging-while-drilling directional measurement tool comprises providing a logging-while-drilling directional resistivity measurement tool with a look-around and look-ahead capability. In this embodiment, the look-around capability is up to about 100 feet and the look-ahead capability of up to about 60 feet.

In an embodiment of this described form of the invention, the step of determining the presence of a predetermined type of formation characteristic in the target formation, comprises: storing, in a memory, a knowledge base comprising several representations of exemplary earth formation characteristic models; providing initial parameter data for said target formation; and comparing said initial parameter data with the models in said knowledge base to select a formation characteristic model, said predetermined type of formation characteristic in the target formation being derived from the selected formation characteristic model. In this embodiment, the step of storing, in a memory, a knowledge base comprising several representations of exemplary earth formation characteristic models comprises storing models that comprise sets of formation geometries and formation physical parameters. Also in this embodiment, the formation parameters include the spatial relationship of the drill bit with respect to said formation characteristic in the target formation, or include the spatial relationship of the drill bit with respect to a selected boundary of said formation characteristic in the target formation. The predetermined types of formation characteristics include a number of characteristic features selected from the group including, but not limited to, a formation fault; a formation reservoir in conjunction with a shale boundary, a ridge, a sand body, a salt dome, and a formation oil/water contact.

In accordance with another form of the invention, a method is set forth for dynamically characterizing a target earth formation, including the following steps: providing drilling equipment having a bottom hole assembly that includes a controllable directional drilling subsystem, and a loggingwhile-drilling directional resistivity measurement tool with a look-around and look-ahead capability; determining the presence of a predetermined type of formation characteristic in the target formation; and drilling in the target formation with said drilling equipment, receiving measurement signals from said directional measurement tool, and further characterizing the predetermined type of formation characteristic in the target formation based on the received measurement signals. In an embodiment of this form of the invention said further characterizing of the predetermined type of formation characteristic in the target formation comprises further characterizing the formation geometry and formation physical parameters in the target formation.

In accordance with a further form of the invention, a method is set forth for producing a borehole drilling plan in a target earth formation, including the following steps: providing a memory; storing, in said memory, a knowledge base comprising several representations of exemplary earth formation characteristic models; providing initial parameter data for said target earth formation; comparing said initial parameter data with the models in said knowledge base and selecting a model from said comparison; and deriving a borehole drilling plan as a function of the selected model. In an embodiment of this form of the invention, the step of deriving a borehole drilling plan comprises deriving a plot as a function of the selected model and of said initial parameter data. In this embodiment, the step of comparing said initial parameter data with said models comprises inverting the initial parameter data and comparing the results of said inversion with said models. In another embodiment, said step of comparing said initial parameter data with said models comprises forward modeling said sets of formation parameters, and comparing the results of said forward modelings with said initial parameter data.

Further features and advantages of the invention will become more readily apparent from the following detailed description when taken in conjunction with the accompanying drawings.

BRIEF DESCRIPTION OF THE DRAWINGS

FIG. 9E illustrates a model or scenario involving geo-stopping before an oil-water contact (OWC) in a vertical well.

FIG. 9F illustrates a model or scenario involving remote detection of fluid contacts in a vertical well.

FIG. 9G illustrates a model or scenario involving remote detection of fluid contact in stacked sand in a vertical well.

FIG. 9H illustrates a model or scenario involving sand injection characterization in a vertical well.

FIG. 10A illustrates a model or scenario involving top salt detection.

FIG. 10B illustrates a model or scenario involving bottom salt detection.

DETAILED DESCRIPTION

Figure 1:
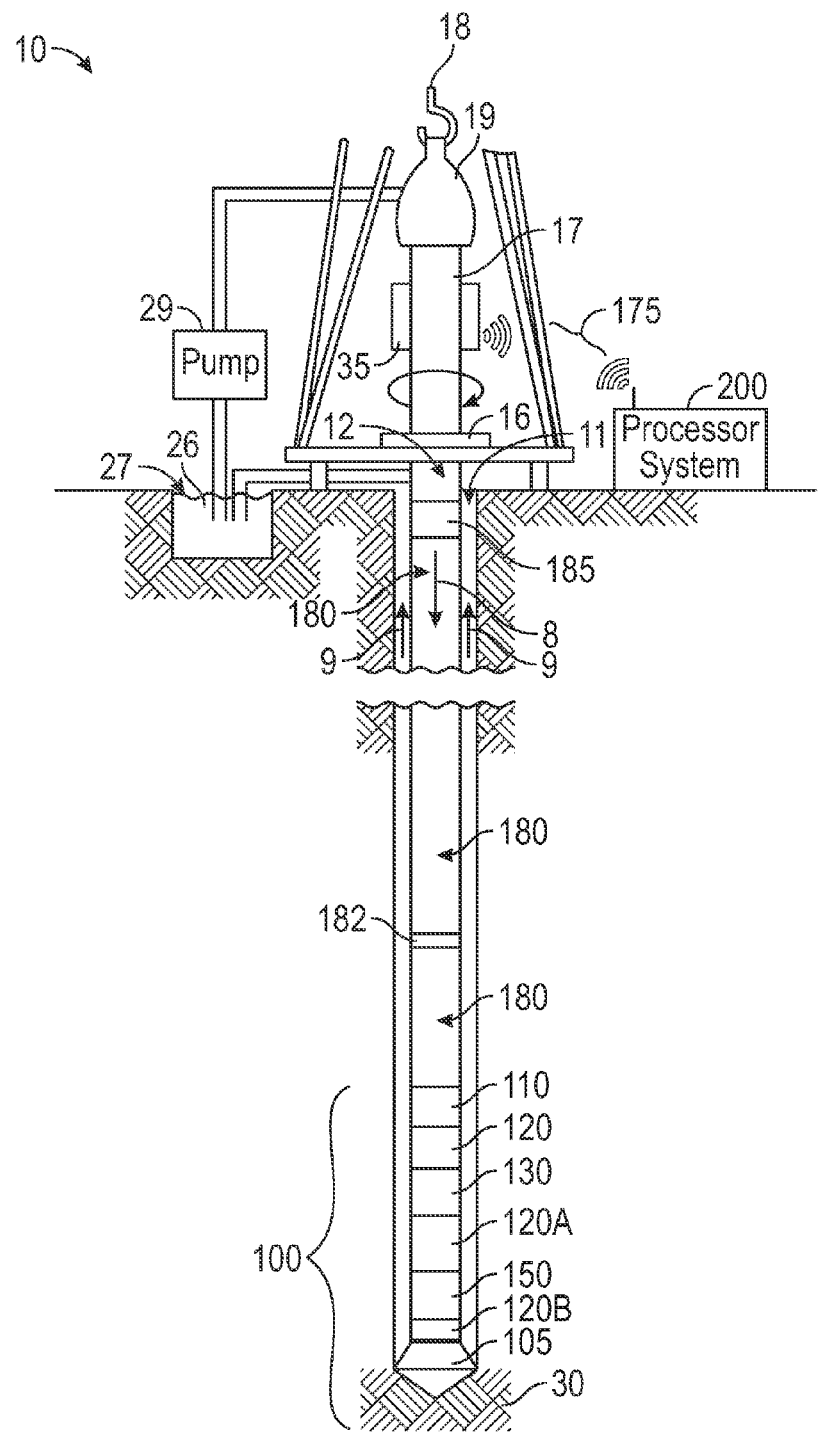
FIG. 1 is a diagram, partially in block form, of an example of a type of wellsite system in conjunction with which the present invention can be practiced.

FIG. 1 illustrates a wellsite system in conjunction with which the present invention can be practiced. The wellsite can be onshore or offshore. In this exemplary system, a borehole 11 is formed in subsurface formations 30 by rotary directional drilling.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 15 and carries formation cuttings up to the surface as it is returned to the pit 27 for recirculation.

As is known in the art, sensors may be provided about the wellsite to collect data, preferably in real time, concerning the operation of the wellsite, as well as conditions at the wellsite. For example, such surface sensors may be provided to measure parameters such as standpipe pressure, hookload, depth, surface torque, rotary rpm, among others.

The bottom hole assembly 100 of the illustrated embodiment includes an interface sub 110, a logging-while-drilling (LWD) module 120, a measuring-while-drilling (MWD) module 130, a rotary steerable system and motor 150 for directional drilling, and drill bit 105.

The LWD module 120 is housed in a special type of drill collar, as is known in the art, and can contain one or a plurality of known types of logging tools. It will also be understood that more than one LWD and/or MWD module can be employed. The representation of FIG. 1 shows additional modules 102A and 120B on opposite sides of the module 150 (the rotary steerable system and motor). As will be described further hereinbelow, these modules can contain antennas which are part of a recently developed LWD directional resistivity measurement tool with look-around and look-ahead capabilities. The LWD module includes capabilities for measuring, processing, and storing information, as well as for communicating with the surface equipment. In the present embodiment, the LWD module includes, particularly, the just noted directional resistivity measurement tool, with a defined look-around and look-ahead capability, described further hereinbelow, and described in detail in PCT International Publication No. WO 2009/029517, assigned to the same assignee of the present application. The LWD modules can also include one or more of the following types of logging devices that measure formation characteristics: a sonic measuring device, a nuclear measuring device, a nuclear magnetic resonance measuring device, a pressure measuring device, a seismic measuring device, an imaging device, and a formation sampling device, among others.

The MWD module 130 is also housed in a special type of drill collar, as is known in the art, and can contain one or more devices for measuring characteristics of the drill string and drill bit. The MWD tool can typically further include an apparatus for generating electrical power to the downhole system. This may typically include a mud turbine generator powered by the flow of the drilling fluid, it being understood that other power and/or battery systems may be employed. The MWD module can include one or more of the following types of measuring devices: a weight-on-bit measuring device, a torque measuring device, a vibration measuring device, a shock measuring device, a stick slip measuring device, a direction measuring device, and an inclination measuring device among others.

In conjunction the present invention, a drill string telemetry system is employed which, in the illustrated embodiment, comprises a system of inductively coupled wired drill pipes 180 that extend from a surface sub 185 to an interface sub 110 in the bottom hole assembly. The relatively high bandwidth, and attendant relatively high data rate, of a wired drill pipe system is advantageous for use in embodiments of the invention, but it will be understood that embodiments of the invention can also operate in conjunction with any suitable communication technology, for example conventional mud pulse communication techniques. Depending on factors including the length of the drill string, relay subs or repeaters can be provided at intervals in the string of wired drill pipes, an example being represented at 182. The relay subs, which can also be provided with sensors, are further described in co-pending U.S. Patent Application Publication Number 2009-0173493 and assigned to the same assignee as the present application.

The interface sub 110 provides an interface between the communications circuitry of the LWD and MWD modules and the drill string telemetry system which, in the example of this embodiment, comprises wired drill pipes with inductive couplers. The interface sub 110, which can also be provided with sensors, as described further in the referenced co-pending U.S. Patent Application Publication Number 2009-0173493.

At the top of the wired drill string, is surface sub or surface interface 185. When a wired drill pipe system is used, a communication link is provided between the topmost wired drill pipe and a surface processor 200. A rotating swivel technique, as disclosed for example in the U.S. Pat. No. 7,040,415, can be used for coupling signals to the processor. At present, a wireless approach is more preferred, for example of the type described further in U.S. Patent Application Publication Number 2007-0030167, and assigned to the same assignee as the present application. As described therein, an uphole interface, in the form of surface sub 185, is coupled with electronics 35 that rotate with kelly 17 and include a transceiver and antenna that communicate bidirectionally with an antenna and transceiver of a control unit which, in the present embodiment, can be an interface for uphole processor system 200. A communication link 175 is schematically depicted between the electronics 35 and an antenna of an uphole interface of processor system 200. Accordingly, the configuration of this embodiment provides a communication link from the uphole processor 200, through communication link 175, to surface sub 185, through the wired drill pipe telemetry system, to downhole interface 110 and the components of the bottom hole assembly and, also, the reverse thereof, for bidirectional operation and control.

In the example of the present embodiment, a rotary steerable subsystem 150 (FIG. 1) is provided, and is adapted for control via the drill string telemetry system. Directional drilling involves the intentional deviation of the wellbore from the path it would naturally take. In other words, directional drilling is the steering of the drill string so that it travels in a desired direction. Directional drilling also enables horizontal drilling through a reservoir and enables a longer length of the wellbore to traverse the reservoir, which increases the production rate from the well. As used in embodiments of the present invention, directional drilling enables relatively accurate navigation and well placement with respect to several or many different types of encountered earth formation characteristics, determined using modeling from a knowledge base, and refined using LWD logging inputs.

A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems. In the point-the-bit system, the axis of rotation of the drill bit is deviated from the local axis of the bottom hole assembly in the general direction of the new hole. The hole is propagated in accordance with the customary three point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems, and how they operate are described in U.S. Patent Application Publication Nos. 2002/0011359 and 2001/0052428 and U.S. Pat. Nos. 6,394,193, 6,364,034, 6,244,361, 6,158,529, 6,092,610, and 5,113,953. In the push-the-bit rotary steerable system there is usually no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form, the drill bit is required to cut side ways in order to generate a curved hole. Examples of push-the-bit type rotary steerable systems, and how they operate are described in U.S. Pat. Nos. 5,265,682, 5,553,678, 5,803,185, 6,089,332, 5,695,015, 5,685,379, 5,706,905, 5,553,679, 5,673,763, 5,520,255, 5,603,385, 5,582,259, 5,778,992, and 5,971,085.

Certain embodiments of the present invention utilize to advantage a logging-while-drilling directional resistivity measurement tool having an improved capability of look-around and look-ahead of the drill bit.

Figure 2:
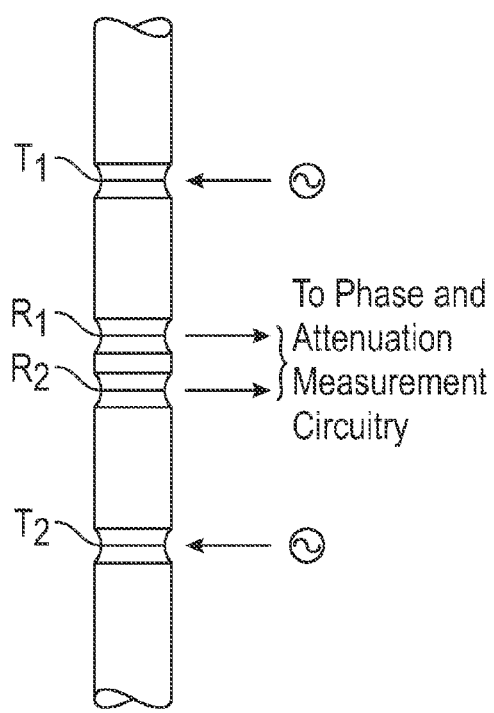
FIG. 2 is a simplified diagram of a measuring-while-drilling resistivity logging device.

An example of an earlier type of resistivity tool which has been employed as an LWD tool is the dual resistivity LWD tool disclosed in U.S. Pat. No. 4,899,112 and entitled "Well Logging Apparatus And Method For Determining Formation Resistivity At A Shallow And A Deep Depth," assigned to the same assignee as the present Application. The tool is shown in FIG. 2, and it is seen that upper and lower transmitting antennas, $T_1$ and $T_2$, have upper and lower receiving antennas, $R_1$ and $R_2$, therebetween. The antennas are formed in recesses in a modified drill collar and mounted in insulating material. This logging device makes advantageous use of the fact that an attenuation measurement sees deeper than a phase measurement taken at the same antenna spacing. The phase shift of electromagnetic energy as between the receivers $R_1$ and $R_2$ provides an indication of formation resistivity at a relatively shallow depth of investigation, and the attenuation of electromagnetic energy as between the receivers $R_1$ and $R_2$ provides an indication of formation resistivity at a relatively deep depth of investigation. The above-referenced U.S. Pat. No. 4,899,112 can be referred to for further details.

Figure 3:
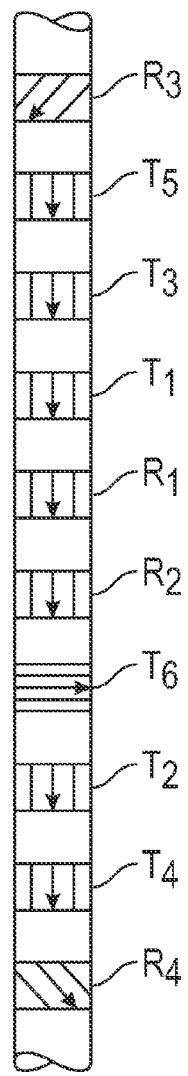
FIG. 3 is a simplified diagram of another measuring-while-drilling resistivity logging device, having a look-around capability.

The LWD resistivity tool of FIG. 3 provides tilted and transverse coils to obtain directionally sensitive measurements. (See L. Chou et al., Oilfield Review, 2005, incorporated herein by reference) The sensor array includes six transmitter antennas and four receiver antennas. Five transmitter antennas ($T_1$ through $T_5$) are arranged axially along the length of the tool. A sixth transmitter antennas ($T_6$) is oriented transverse to the tool axis. A receiver antenna is positioned at each end of the tool. This pair of receiver antennas ($R_3$ and $R_4$) brackets the transmitters, and each of these receivers is tilted 45 degrees to the tool axis. An additional pair of receiver antennas ($R_1$ and $R_2$), located in the center of the transmitter array, is arranged axially and can obtain conventional type propagation resistivity measurements. The described arrangement produces a preferential sensitivity to conductivity on one side of the tool. As the tool rotates, its sensors can detect nearby conductive zones and register the direction from which maximum conductivity can be measured (look-around capability). Magnetometers and accelerometers can provide reference directional orientation data for the tool. In addition to its directional capability, the tool provided measurements that were deeper than previously available LWD resistivity tools.

Figure 4:
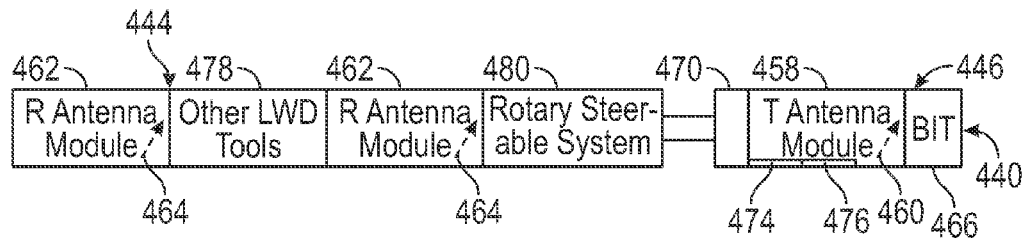
FIG. 4 is a simplified diagram of another measuring-while-drilling resistivity logging device, having look-around and look-ahead capabilities.

In PCT Published Application WO 2009/029517, assigned to the same assignee as the present Application, incorporated herein by reference, and entitled "Look Ahead Logging System," there is disclosed an LWD logging device with a resistivity array oriented to enable sensitivity in desired directions, including ahead of the logging system and ahead of the bit. One of the embodiments thereof is shown in FIG. 4. As seen, system 440 comprises a logging while drilling system 444 combined with a tool, such as a bottom hole assembly 446. Bottom hole assembly 446 includes the drill bit (466 in this diagram). The logging while drilling system 444 includes a transmitter module 458 having a transmitter antenna 460 and a receiver module 462 having a receiver antenna 464. In the specific example illustrated, the logging while drilling system 444 comprises a plurality, e.g. two, of the receiver modules 462. The transmitter module 458 and the receiver module or modules 462 are positioned at separate locations along the bottom hole assembly 446, and the spacing is selected to provide a desired depth of investigation. The transmitter module 458 is located close to a drill bit 466 of bottom hole assembly 446. In this example, the transmitter module 458 is mounted on a sub behind drill bit 466 and forward to rotary steerable system 480. With such a system, a measure point (taken as the midpoint between transmitter module 458 and receiver module 462) is pushed towards the drill bit 466 in a manner that provides not only radial sensitivity (look-around) but also sensitivity ahead of the transmitter antenna 460 (lock-ahead). As described in the '517 Published Application, various antenna configurations may be utilized. For example, the transmitter module 458 may have a tilted antenna 460. Use of a tilted antenna means the magnetic dipole moment is not aligned with the tool axis, e.g. the bottom hole assembly axis, nor is the magnetic dipole moment orthogonal to the tool axis. The receiver module 462 also may use a tilted antenna 464, or its antenna 464 may comprise an axial antenna in which its magnetic dipole moment is along the tool axis or orthogonal to the tool axis. In one described embodiment, the total number of antennas in the transmitter and receiver modules is four, and many configurations of those four antennas can be utilized. The antennas 460, 464 also may comprise electric dipole antennas. By the way of example, magnetic dipole antennas, such as coils, may be used in induction and/or propagation measurements. Electric dipole antennas may use electrodes and/or toroids. Depending and the specific application, the roles of transmitter antennas and receiver antennas can be interchanged. The transmitter module 458 and antenna 460 may be added to a bit box 470 of a mud motor (not separately shown) used to drive the drill bit 466. Each transmitter module 458 also may comprise one or more sensors 474 and the associated electronics 476 that are powered through an external or internal wire or by an onboard battery. Additionally, the logging while drilling system 444 can incorporate a variety of other modules 478 that may comprise a variety of tools or sensors. As further described in the '517 Published Application. Sensors 474, such as electromagnetic sensors, are positioned directly behind drill bit 466 or can be integrated with the drill bit 466. Alternatively, the sensor or sensors 474, along with corresponding electronics 476, can be mounted directly on the rotary steerable system 480, or on a mud motor. As further described, a variety of antennas can be utilized. For example, the transmitter antenna 460 can be formed as a tri-axial antenna TX, and the receiver antennas 464 may be formed as tri-axial RCV antennas. The corresponding sensors may be individual sensors or combinations of induction/propagation and/or laterolog sensors. In other embodiments, as disclosed in the '517 Published Application, the antennas can be toroidal electric dipole antennas that may be particularly useful for wells drilled with oil base mud. Reference can be made to the '517 Published Application for further details. Reference can also be made to U.S. Pat. Nos. 7,612,565 and 7,656,160, and to U.S. Patent Application Publications 2006/0011385 and 2008/0136419, all assigned to the same assignee as the present Application, and incorporated herein by reference.

Figure 5:
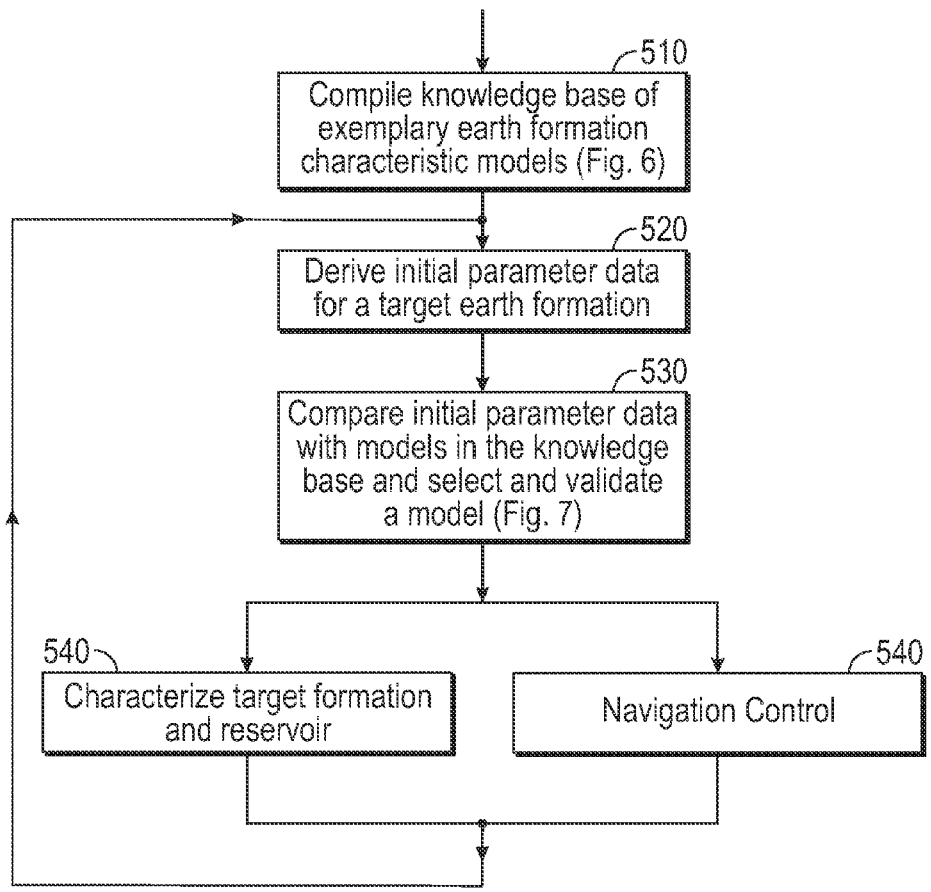
FIG. 5 is a flow diagram of a routine for controlling a processor for practicing an embodiment of the invention.
Figure 6:
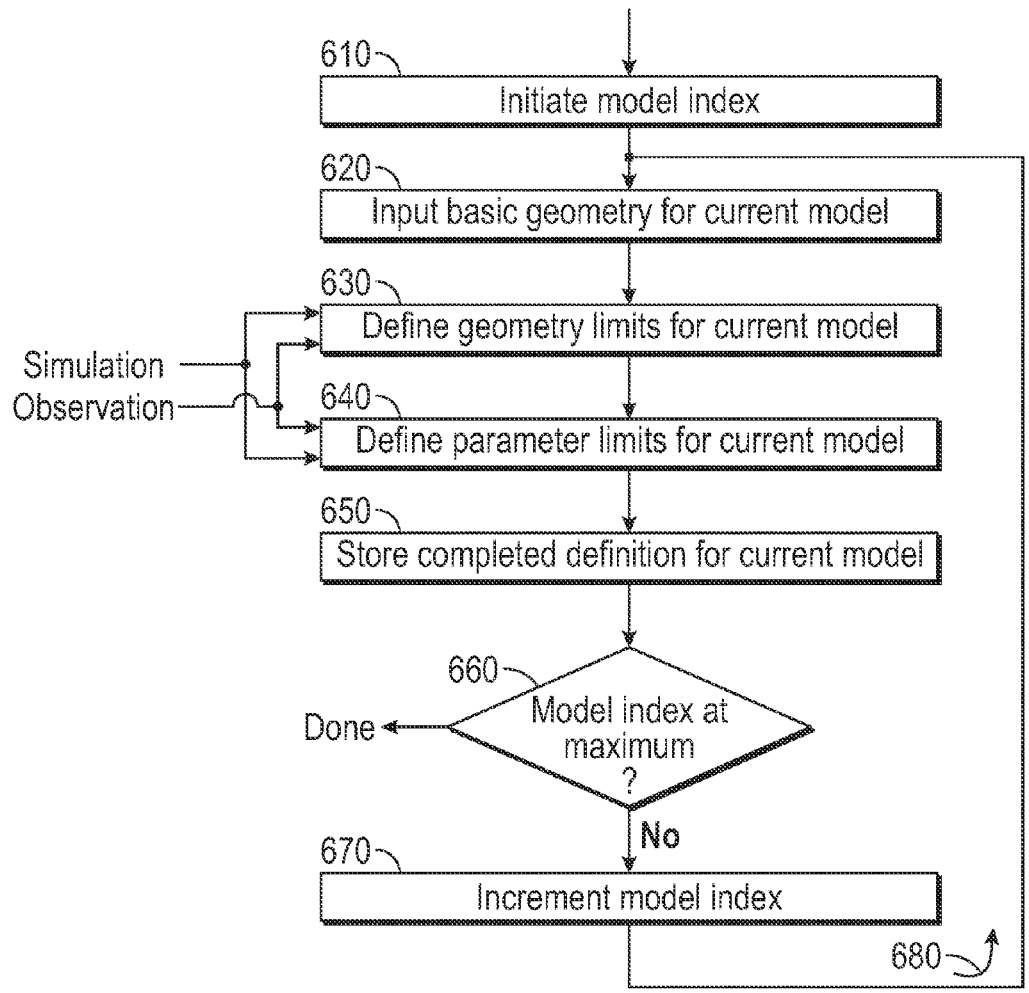
FIG. 6 is a flow diagram of the routine represented by the block 510 of the FIG. 5 routine, for compiling representations, in a knowledge base, representative of exemplary earth formation characteristic models.

Referring to FIG. 5, there is shown a flow diagram of routine for controlling a processor, such as the computer processor 200 of FIG. 1, for practicing an embodiment of the invention. The block 250 represents the compiling of a knowledge base of exemplary earth formation characteristic models. [FIG. 6 is a more detailed flow diagram of the routine represented by the block 510.] In an example of the present embodiment, the formation characteristic models are grouped in several application categories, as follows:
1. Reservoir Navigation (FIGS. 8A-8N);
2. Geo-Stopping Applications in Vertical Wells (FIGS. 9A-9H);
3. Salt Navigation (FIGS. 10A-10H);
4. Fault Detection and Characterization (FIGS. 11A-11F);
5. Tar Detection (FIGS. 12A-12C);
6. Channel Sand Navigation (FIGS. 13A-13C);
7. Formation Evaluation (FIGS. 14A-14G).

It will be understood that these categories, and the models in each category, can be modified and/or supplemented for implementation of the invention in other variations.

Figure 11A:
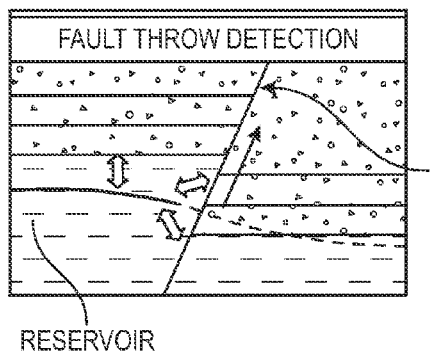
FIG. 11A illustrates a model or scenario involving fault throw detection at the bit.

For initial illustration of formation characteristic modeling, reference can be made to Category (4), Fault Detection and Characterization, which is one of the exemplary categories. FIG. 11A shows an example of formation bedding having a dipping fault therein. The darkest region is a pay reservoir and the curved solid line is the borehole trajectory up to a point in time. The leftmost double-headed arrow represents the "look-around" capability of the LWD resistivity device and the two rightmost double-headed arrows represent the "look-ahead" capability of the LWD resistivity device. In this case, detection of a fault ahead of the bit, and estimation of its corresponding throw, can be used to change the subsequent trajectory (shown in dashed line) of directional drilling to maximize the distance in the pay zone after the fault.

Figure 11B:
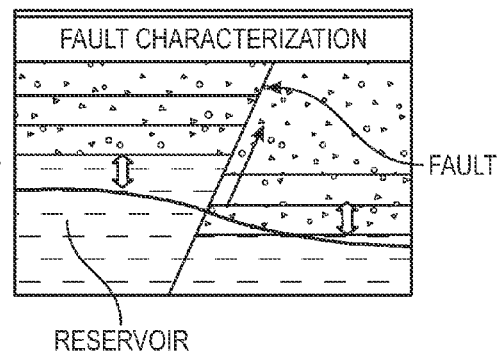
FIG. 11B illustrates a model or scenario involving fault characterization.

In the next modeling scenario, shown in FIG. 11B, the formation is the same, and the drilling trajectory has continued from FIG. 11A. In this case, the double-headed arrows represent the use of the look-around capability of the LWD resistivity device to determine the fault and reservoir characteristics, and continue to navigate accordingly.

Referring again to FIG. 5, the block 520 represents the derivation of initial parameter data for the target formation. This data may include, for example, seismic measurements, or any other measurements including, but not limited to, density, neutron, resistivity, sonic, from which inferences can be drawn to help characterize the formation. Then, as represented by the block 530, the initial parameter data is compared with models in the knowledge base, and a model is selected and validated on the basis of a favorable match. Based on the selected and validated model, directional drilling navigation control decisions can be made (block 540) and/or the target formation and reservoir can be characterized (block 550), such as by outputting formation geometry and parameters. The block 520 can then be re-entered for further consideration of the current target formation or the next target formation.

Referring to FIG. 6, there is shown a flow diagram of a routine for compiling a knowledge base of formation characteristic models, in accordance with the function represented by the block 510 of FIG. 5. A model index is initiated (block 610), and the basic geometry for the current model is input (block 620). The models may be, for example, of the types described in conjunction with FIGS. 8-14 hereof, it being understood that many other types of models and target formation scenarios can be included, based on existing experience as well as experience that is gained in the future. For the current model being entered, the block 630 represents defining of geometry limits for the model. This can include, for example, the ranging of bedding thicknesses and orientations, formation features, etc., as well as any other geometric features and/or constraints that are considered useful for the model. Also, as represented by the block 640, parameter limits (for resistivity and other selected formation variables) are defined. As indicated on the diagram, these can be derived from existing knowledge and simulations, as well as, dynamically, current and/or future observation, which can be used to add models to the knowledge base or edit existing stored models. After the completed definition for the current model is stored (block 650), determination is made (decision block 660) as to whether the model index indicates that the last model has been compiled. If not, the model index is incremented (block 670) the block 620 is re-entered and the loop 680 is continued until all the desired formation characteristic models are entered into the knowledge base. It will be understood that the knowledge base can be continually refined and improved as additional understanding of formation characteristics, for example determined using improved look-around and look-ahead devices, as described hereinabove, are employed.

Figure 7:
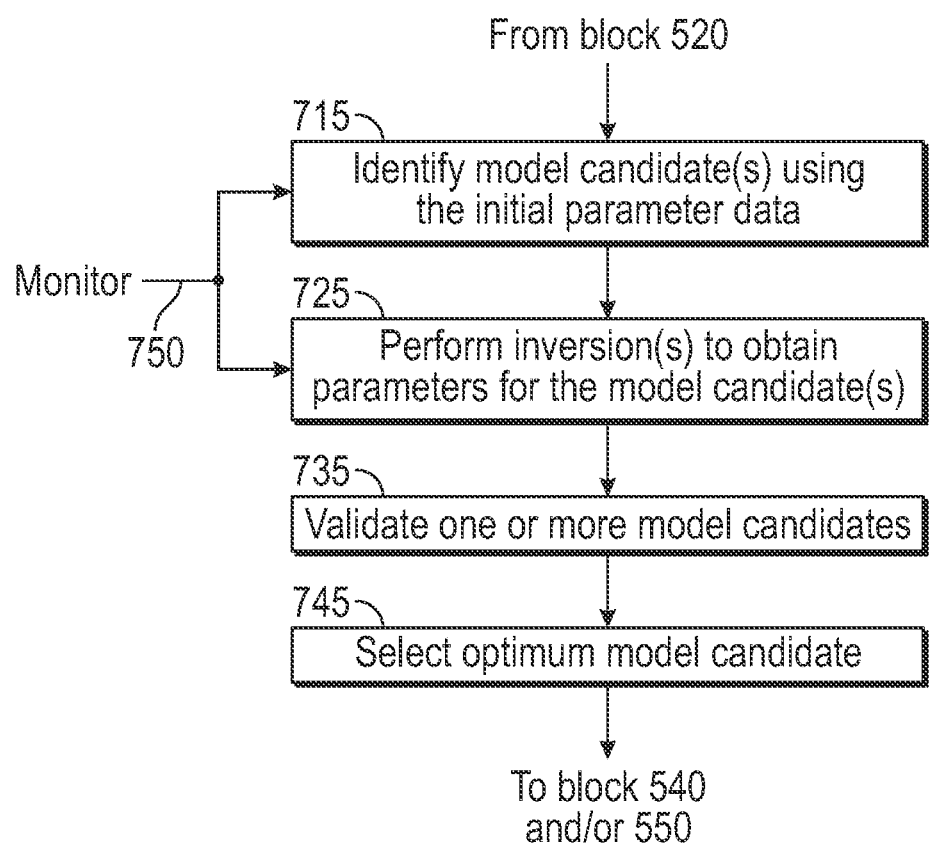
FIG. 7 is a flow diagram of the routine represented by the block 530 of the FIG. 5 routine, for selecting and validating a formation characteristic model.

Referring to FIG. 7, there is shown a flow diagram of a routine for implementing an embodiment of the function represented by block 530 of FIG. 5, for selecting and validating a stored formation characteristic model. The block 715 of this embodiment represents identifying a model candidate from among the stored models, for example, based on the derived data of block 520 (FIG. 5). In the embodiment of FIG. 7, an inversion is performed (block 775) using the input data, to obtain parameters for the model candidate(s) (for example, a two-dimensional parameterized layer cake model). Reference can be made, for example, to U.S. Pat. No. 7,366,616 with regard suitable types of inversion techniques. An optional validation routine can then be used (block 735) to determine whether a selected model meets a predetermined validity probability, such as by using a cost function analysis. If more than one stored model was being considered for validation, the highest probability result can be used to select the optimum model candidate (block 745). Based on further derived data, monitoring and updated model determination can be implemented, as represented by arrow 750.

In the following diagrams and descriptions, double-headed arrows are again used to denote use of look-around and look-ahead capabilities, employed in the context of the invention.

Figure 8A:
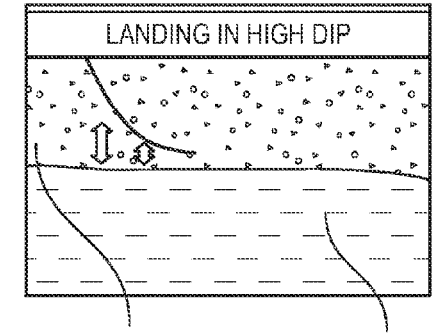
FIG. 8A illustrates a model or scenario involving landing in a high dip reservoir.

FIG. 8A illustrates a model or scenario involving landing in a high dip reservoir. Early detection of the reservoir top enables optimization of the well trajectory.

Figure 8B:
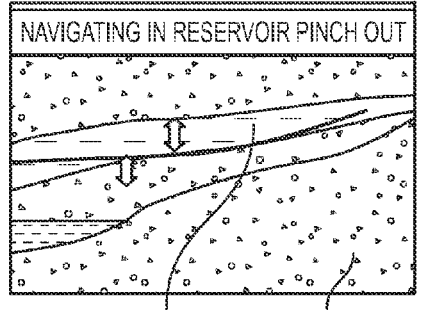
FIG. 8B illustrates a model or scenario involving navigation in a reservoir pinch-out formation.

FIG. 8B illustrates a model or scenario involving navigation in a reservoir pinch-out formation. When navigating in a reservoir pinch-out, delineation of the reservoir main boundaries allows optimized placement of the well path.

Figure 8C:
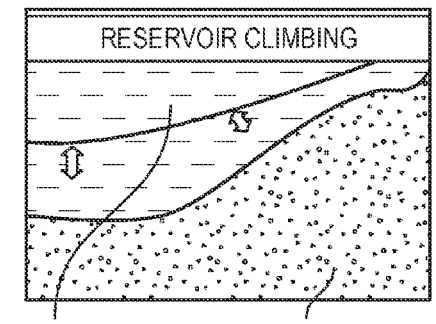
FIG. 8C illustrates a model or scenario involving staying in a reservoir in a high dip bottom formation.

FIG. 8C illustrates a model or scenario involving staying in reservoir a in a high dip bottom formation. If the reservoir has an upturn of reasonable dip, it can be detected early enough for a trajectory correction to be made.

Figure 8D:
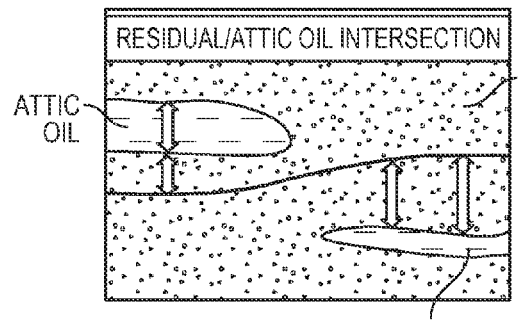
FIG. 8D illustrates a model or scenario involving navigation for intersection with residual oil pockets.

FIG. 8D illustrates a model or scenario involving navigation for intersection with residual oil pockets. A mix of look-around and look-ahead is useful to find and steer towards attic or compartmentalized oil pockets.

Figure 8E:
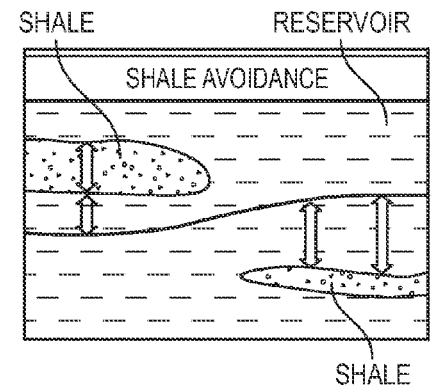
FIG. 8E illustrates a model or scenario involving navigating in a reservoir with shale avoidance.

FIG. 8E illustrates a model or scenario involving navigating in a reservoir with shale avoidance. When navigating through the reservoir, early detection of shale region with look-ahead and look-around allows maximization of distance in the reservoir and reduces drilling risks.

Figure 8F:
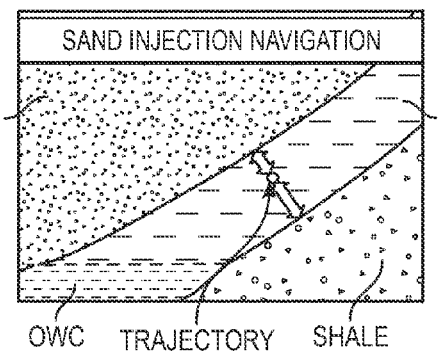
FIG. 8F illustrates a model or scenario involving navigation in a sand injection wing.

FIG. 8F illustrates a model or scenario involving navigation in a sand injection wing. When navigating within a sand injection wing, detection ahead of the bit and look-around allows staying within the rapidly changing sand body geometry and having earlier decision for trajectory changes.

Figure 8G:
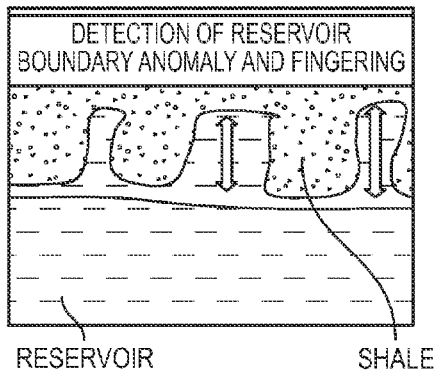
FIG. 8G illustrates a model or scenario involving detecting and navigating a reservoir anomaly and fingering.

FIG. 8G illustrates a model or scenario involving detecting and navigating a reservoir anomaly and fingering. When navigating close to the top of a reservoir, the look-around capability permits delineation of the boundary irregularities (anomalies) and their extent.

Figure 8H:
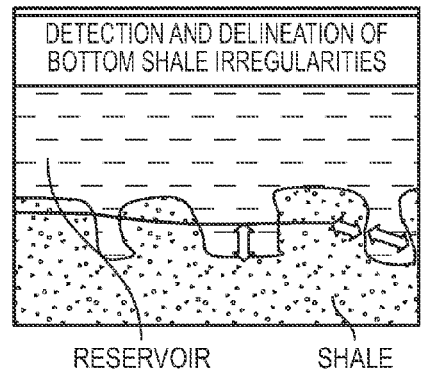
FIG. 8H illustrates a model or scenario involving detection and delineation of bottom shale irregularities.

FIG. 8H illustrates a model or scenario involving detection and delineation of bottom shale irregularities. This is similar to the prior case.

Figure 8I:
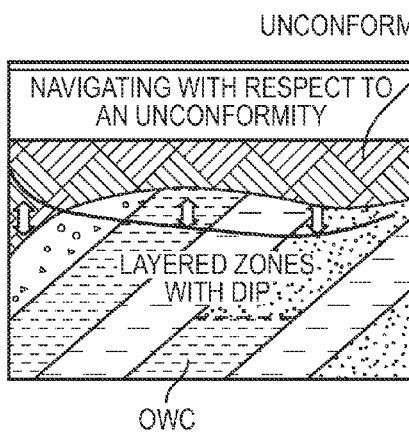
FIG. 8I illustrates a model or scenario involving navigating with respect to an unconformity.

FIG. 8I illustrates a model or scenario involving navigating with respect to an unconformity. When navigating close to unconformity, the 2D objective is delineation of the unconformity boundary and at the same time determine the formation dip.

Figure 8J:
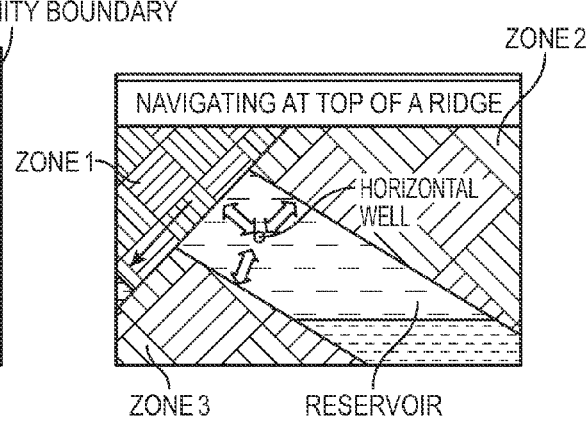
FIG. 8J illustrates a model or scenario involving navigating at the top of a ridge.

FIG. 8J illustrates a model or scenario involving navigating at the top of a ridge. When navigating close to the top of a ridge, simultaneous detection of boundaries permits wellbore placement optimization.

Figure 8K:
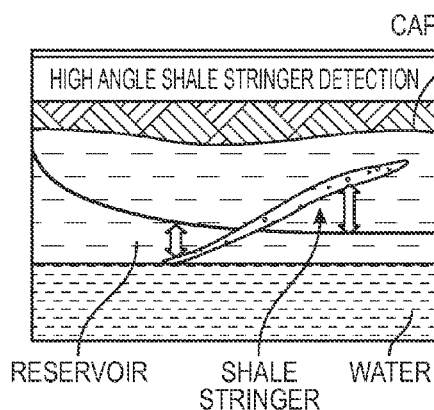
FIG. 8K illustrates a model or scenario involving shale stringer detection in a horizontal well and navigating to avoid the shale.

FIG. 8K illustrates a model or scenario involving shale stringer detection in a horizontal well and navigating to avoid the shale. Detection of incoming thin shale layers in a homogenous formation (1D). 2D and 3D effects are likely if the formation is already layered. Reduction of drilling hazard and maximization in the pay result from shale avoidance. Look-ahead offers early detection and more efficient well trajectory correction.

Figure 8L:
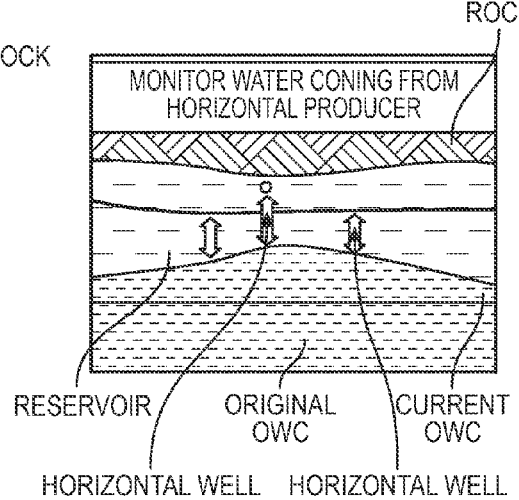
FIG. 8L illustrates a model or scenario involving monitoring of water coning in a horizontal producer reservoir.

FIG. 8L illustrates a model or scenario involving monitoring of water coning in a horizontal producer reservoir. Water coning can be monitored in a producer well or nearby well.

Figure 8M:
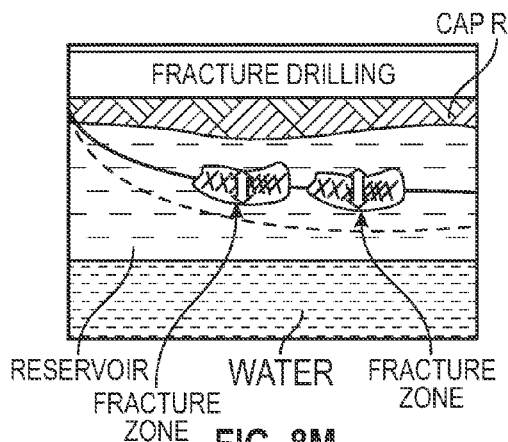
FIG. 8M illustrates a model or scenario involving geo-steering, finding and geo-steering into fracture zone, and optimization of fracture drilling with respect to orientation of fractures.

FIG. 8M illustrates a model or scenario involving geo-steering, finding and geo-steering into fracture zone, and optimization of fracture drilling with respect to orientation of fractures.

Figure 8N:
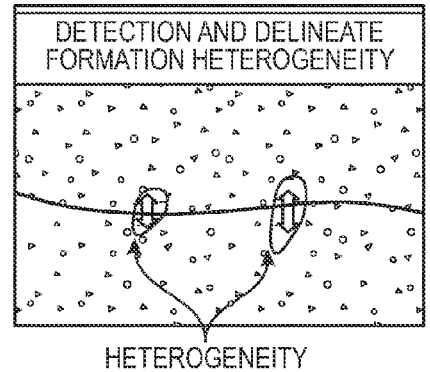
FIG. 8N illustrates a model or scenario involving detection and delineation of heterogeneities around the borehole.

FIG. 8N illustrates a model or scenario involving detection and delineation of heterogeneities around the borehole.

Figure 9A:
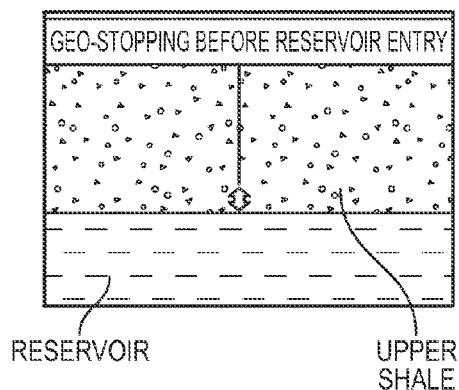
FIG. 9A illustrates a model or scenario involving geo-stopping in a vertical well before entering the reservoir.

FIG. 9A illustrates a model or scenario involving geo-stopping in a vertical well before entering the reservoir. Generally, it is desirable to stop 2 to 3 m ahead of the bit.

Figure 9B:
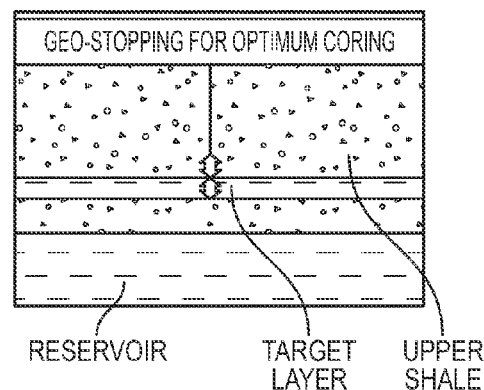
FIG. 9B illustrates a model or scenario involving geo-stopping in a vertical well for optimum coring.

FIG. 9B illustrates a model or scenario involving geo-stopping in a vertical well for optimum coring. Generally, the layer of formation targeted for coring is crossed before being identified. The objective is to detect and stop before entering such a layer.

Figure 9C:
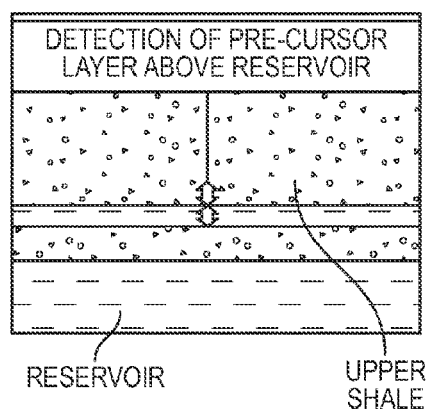
FIG. 9C illustrates a model or scenario involving detecting a pre-cursor layer above the reservoir ahead of the bit in a vertical well.

FIG. 9C illustrates a model or scenario involving detecting a pre-cursor layer above the reservoir ahead of the bit in a vertical well. An objective is determining when it is the actual reservoir and not a pre-cursor layer.

Figure 9D:
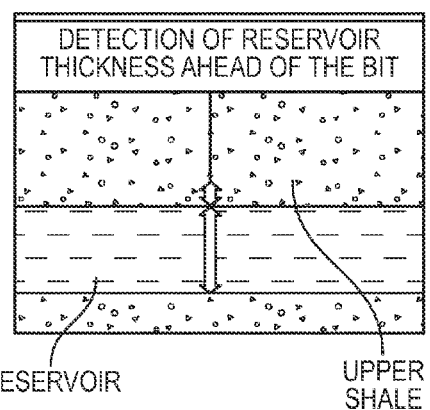
FIG. 9D illustrates a model or scenario involving detecting a reservoir thickness ahead of the bit in a vertical well.

FIG. 9D illustrates a model or scenario involving detecting a reservoir thickness ahead of the bit in a vertical well. When geo-stopping at the top of a reservoir, estimation of the thickness of the reservoir can be important for calibration of the seismic measurement and for planning of the next drill section.

FIG. 9E illustrates a model or scenario involving geo-stopping before an oil-water contact (OWC) in a vertical well. Once the reservoir has been penetrated, stopping 5 to 6 m above an OWC is also considered necessary. Gas-oil contact is also of interest but usually cannot be detected with EM measurement alone because of the lack of resistivity contrast. In such case, an acoustic measurement would be an option to have any look-ahead capability.

FIG. 9F illustrates a model or scenario involving remote detection of fluid contacts in a vertical well. Using look-around, an application is to detect OWC away from the well bore.

FIG. 9G illustrates a model or scenario involving remote detection of fluid contact in stacked sand in a vertical well. Using look-around, an application is to detect OWC away from the well bore and in a different proximal sand layer.

FIG. 9H illustrates a model or scenario involving sand injection characterization in a vertical well.

FIG. 10A illustrates a model or scenario involving top salt detection. Usually in a low angle well, detection ahead of the bit of the salt top (salt entrance) allows setting a stopping point for casing. Because of the plasticity of the salt, regions around the salt boundary may be unstable (unconsolidated, and with pressure differences) and have higher drilling risks.

FIG. 10B illustrates a model or scenario involving bottom salt detection. Usually in a low angle well, detection ahead of the bit of the salt bottom (salt exit) allows setting of a stopping point for casing. Again, because of the plasticity of the salt, regions around the salt boundary may be unstable (unconsolidated, and with pressure differences) and have higher drilling risks. The lower shale may have precursor layering (intermediary shale).

Figure 10C:
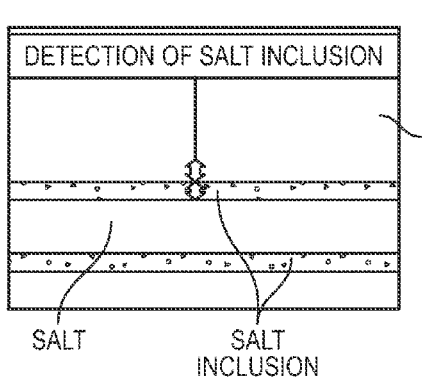
FIG. 10C illustrates a model or scenario involving salt inclusion detection.

FIG. 10C illustrates a model or scenario involving salt inclusion detection. While drilling through salt, usually in a low angle or vertical well, detection ahead of the bit of the salt inclusion (shale) and its thickness allows determining if the salt bottom has been reached. These inclusions are usually horizontal.

Figure 10D:
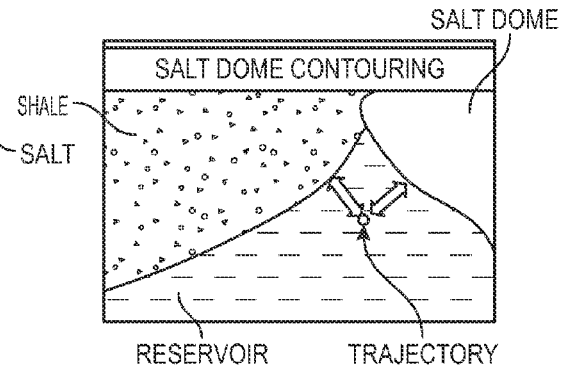
FIG. 10D illustrates a model or scenario involving salt dome contouring next to shale and a pay zone.

FIG. 10D illustrates a model or scenario involving salt dome contouring next to shale and a pay zone. To maximize trajectory in pay while drilling around a salt dome, the proximity and distance to both salt dome and sealing shale layer can be determined. Using the look-ahead allows earlier trajectory change.

Figure 10E:
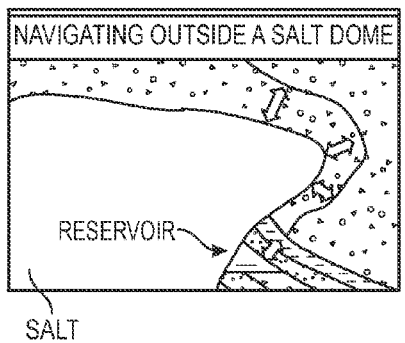
FIG. 10E illustrates a model or scenario involving navigation external to a salt dome.

FIG. 10E illustrates a model or scenario involving navigation external to a salt dome. Navigation outside the salt dome boundary is achieved by maintaining the trajectory at a certain distance away from the salt boundary and detecting pay layers trapped by the salt dome potentially ahead of the bit. The salt boundary could have an external layer. Navigation inside a salt dome is very difficult because of the homogeneity of the salt. If detection at large distance of the salt boundary is beyond the range of EM look-around or look-ahead, a borehole acoustic or radar measurement may be better suited.

Figure 10F:
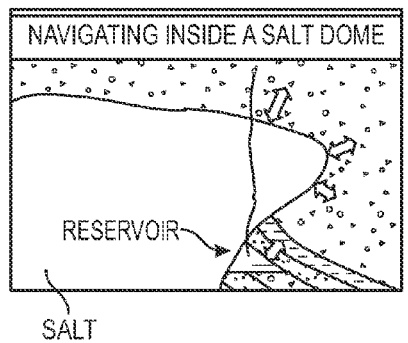
FIG. 10F illustrates a model or scenario involving navigation internal to a salt dome.

FIG. 10F illustrates a model or scenario involving navigation internal to a salt dome. Some similar considerations as the previous case.

Figure 10G:
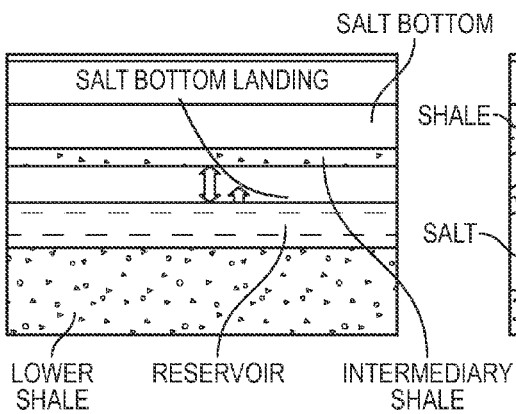
FIG. 10G illustrates a model or scenario involving landing at the bottom of a salt region above a reservoir.

FIG. 10G illustrates a model or scenario involving landing at the bottom of salt region above a reservoir. When approaching the salt bottom at high angle (landing), detection of the incoming salt boundary allows optimum position of the borehole above a reservoir (borehole inclination) in preparation for the next reservoir drilling phase.

Figure 10H:
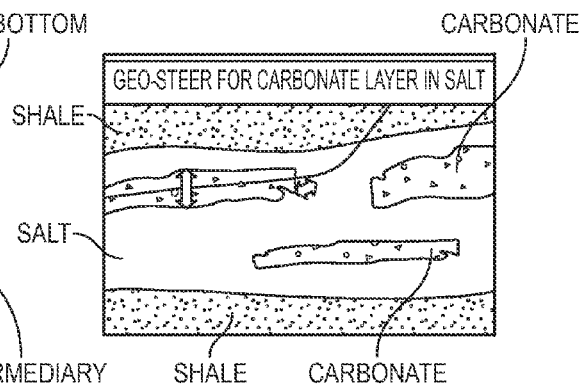
FIG. 10H illustrates a model or scenario involving geo-steer to enter and stay within a carbonate layer in salt.

FIG. 10H illustrates a model or scenario involving geo-steer to enter and stay within a carbonate layer in salt. Look-ahead is useful to find a carbonate layer and stay within the layer.

FIG. 11A illustrates a model or scenario involving fault throw detection at the bit. This was discussed earlier in the Specification.

FIG. 11B illustrates a model or scenario involving fault characterization. This was also discussed earlier in the Specification.

Figure 11C:
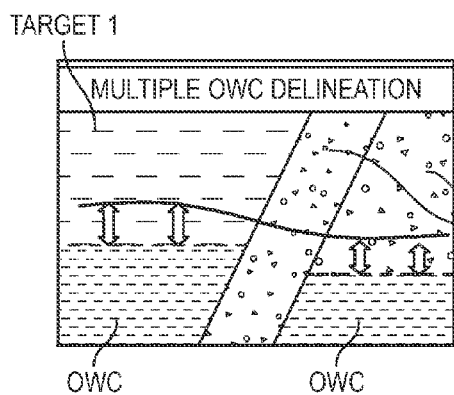
FIG. 11C illustrates a model or scenario involving multiple OWC delineation in a formation with a fault.

FIG. 11C illustrates a model or scenario involving multiple OWC delineation in a formation with a fault. Using the look-around, steering can be done with respect to OWC at different total vertical distance when separated by a fault (sealed).

Figure 11D:
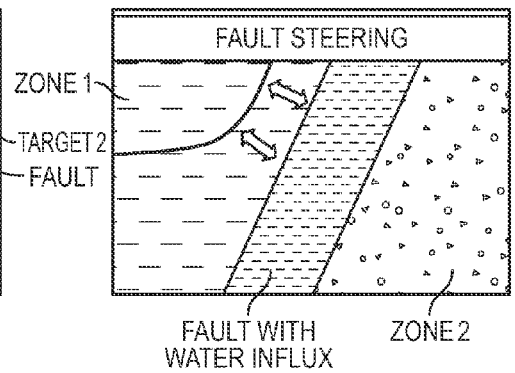
FIG. 11D illustrates a model or scenario involving fault steering to avoid water influx.

FIG. 11D illustrates a model or scenario involving fault steering to avoid water influx. Using the look-around and look-ahead, steering can be done with respect to a fault to avoid water influx via fracture fault.

Figure 11E:
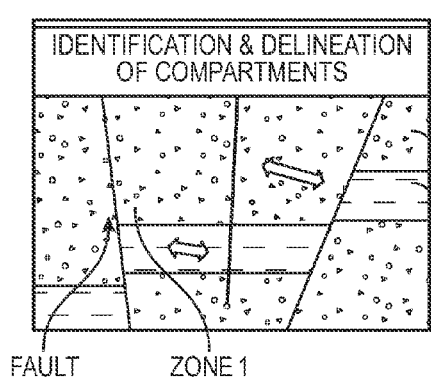
FIG. 11E illustrates a model or scenario involving identification and delineation of compartments between faults.

FIG. 11E illustrates a model or scenario involving identification and delineation of compartments between faults.

Figure 11F:
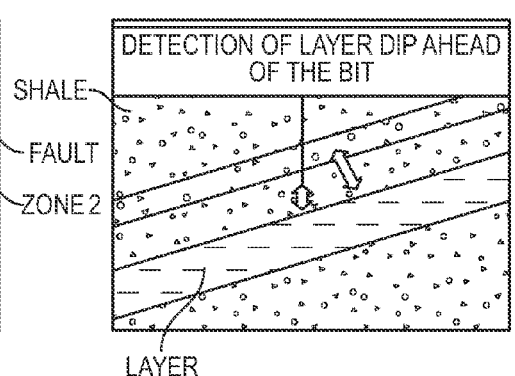
FIG. 11F illustrates a model or scenario involving detection of layer dip ahead of the bit.

FIG. 11F illustrates a model or scenario involving detection of layer dip ahead of the bit. The look-around and look-ahead can be used to estimate the dip of the layer ahead of the bit.

Figure 12A:
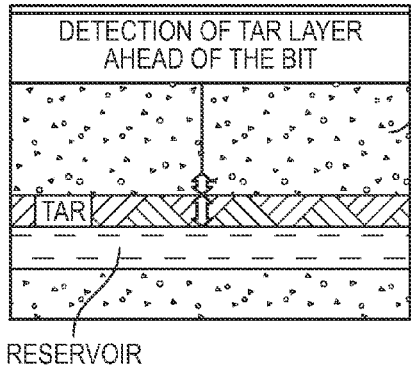
FIG. 12A illustrates a model or scenario involving tar layer detection ahead of the bit.

FIG. 12A illustrates a model or scenario involving tar layer detection ahead of the bit. Tar sand (unconsolidated) when viscous enough will ooze into the borehole causing the bottom hole assembly to get stuck or twisted off. If the tar is solid enough, there is no problem associated with drilling. Detection of the tar layer ahead of the bit allows stopping drilling and applying mitigation actions such as pumping chemical to harden the tar. Drilling risk is then reduced. For tar or very heavy oil in hydrocarbon column and with gravity, the reservoir may go from moveable oil at the top to high viscosity oil at the bottom. In this case, the tar contact is not detectable using resistivity. NMR measurement can be used to look for this contact.

Figure 12B:
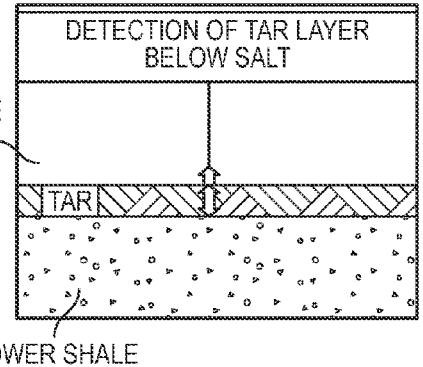
FIG. 12B illustrates a model or scenario involving tar layer detection below salt.

FIG. 12B illustrates a model or scenario involving tar layer detection below salt. When tar sand is immediately below salt (tar is usually high resistivity and salt infinite resistivity), detection of the tar layer ahead of the bit allows stopping drilling and applying mitigation actions such as pumping chemical to harden the tar. Drilling risk is then reduced including cost.

Figure 12C:
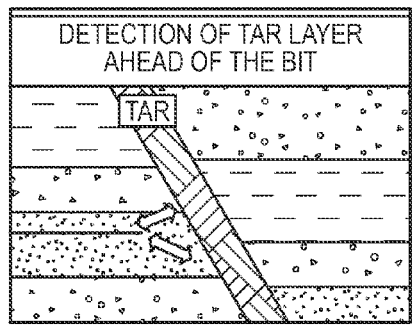
FIG. 12C illustrates a model or scenario involving detection of a fault filled with tar.
Figure 13A:
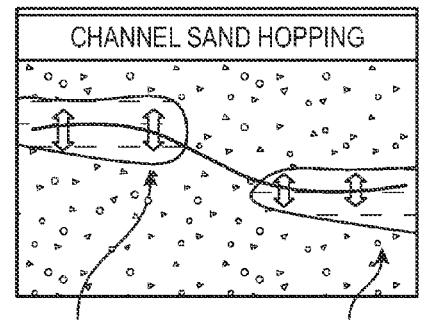
FIG. 13A illustrates a model or scenario involving hopping between channel sand regions.

FIG. 12C illustrates a model or scenario involving detection of a fault filled with tar. When tar is coming through a fault, the fault is then resistive and could also contain oil or be mineralized. Detection ahead of the bit in vertical or horizontal applications would again allow applying mitigation actions such as pumping chemical to harden the tar. Drilling risk is then reduced. On the other hand, the fault can also contain water and be very conductive FIG. 13A illustrates a model or scenario involving hopping between channel sand regions. When crossing channel sand, an application is to evaluate the lateral size of the channel sand and to detect ahead of the bit the direction of the next channel sand.

Figure 13B:
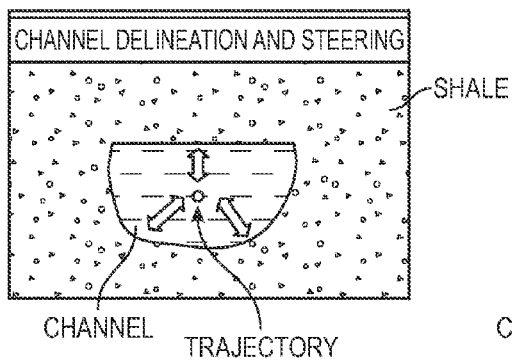
FIG. 13B illustrates a model or scenario involving sand channel delineation and steering.

FIG. 13B illustrates a model or scenario involving sand channel delineation and steering. When inside a sand channel, determination of the proximity to a sand channel boundary permits steering and staying within this channel.

Figure 13C:
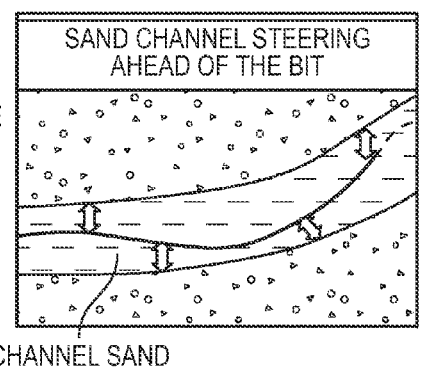
FIG. 13C illustrates a model or scenario involving sand channel steering ahead of the bit.

FIG. 13C illustrates a model or scenario involving sand channel steering ahead of the bit. When inside a sand channel, determination of the proximity to a sand channel boundary ahead of the bit permits steering and staying within this channel with advance notice for trajectory changes.

Figure 14A:
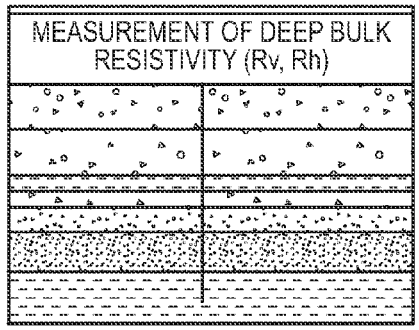
FIG. 14A illustrates a model or scenario involving measurement of deep bulk resistivity when drilling through an upper shale section.

FIG. 14A illustrates a model or scenario involving measurement of deep bulk resistivity when drilling through an upper shale section.

Figure 14B:
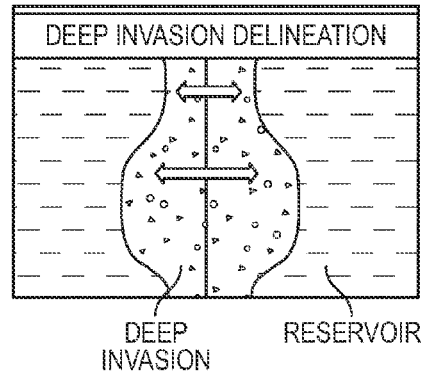
FIG. 14B illustrates a model or scenario involving deep invasion delineation in a low permeability reservoir.

FIG. 14B illustrates a model or scenario involving deep invasion delineation in a low permeability reservoir. Here the use of the long spacing allows delineating very deep invasion (diameter>20 ft) for a low permeability reservoir.

Figure 14C:
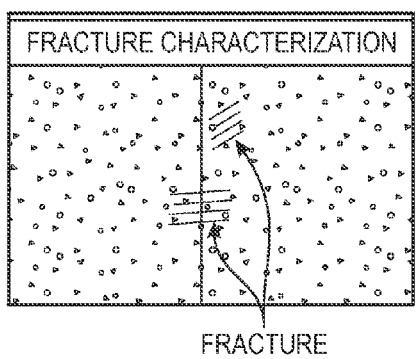
FIG. 14C illustrates a model or scenario involving fracture characterization.

FIG. 14C illustrates a model or scenario involving fracture characterization. For certain type of fractures and with enough lateral extent, estimation of fracture density can be performed using the look-around capability.

Figure 14D:
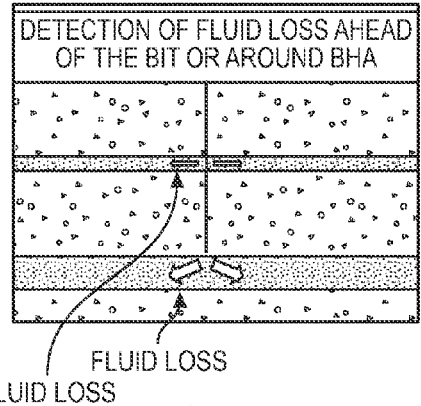
FIG. 14D illustrates a model or scenario involving detection and monitoring of fluid loss ahead of the bit or around the bottom hole assembly.

FIG. 14D illustrates a model or scenario involving detection and monitoring of fluid loss ahead of the bit or around the bottom hole assembly. When drilling and when encountering a mud loss, monitoring of the formation resistivity ahead of the bit or around the bottom hole assembly may give an indication of where the loss of fluid takes place.

Figure 14E:
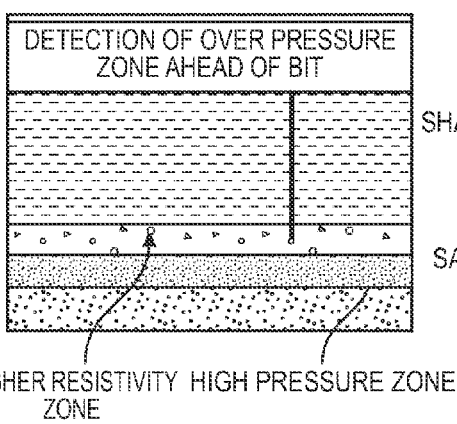
FIG. 14E illustrates a model or scenario involving pore pressure prediction and pressure zone detection ahead of bit.

FIG. 14E illustrates a model or scenario involving pore pressure prediction and pressure zone detection ahead of bit. As the resistivity slowly increases and the cause of the increase is identified as a potential overpressure zone (pore pressure prediction) either from acoustic tools or field experience, the look-ahead capability can be used to detect this incoming zone early and allow mitigation actions to minimize drilling risks.

Figure 14F:
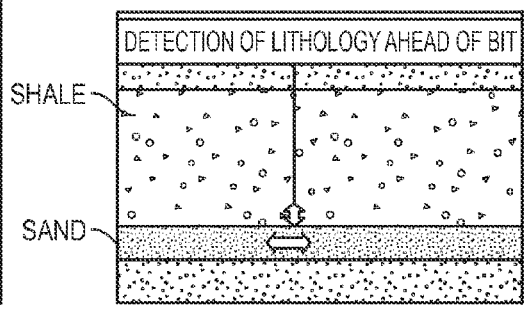
FIG. 14F illustrates a model or scenario involving detection of lithology ahead of the bit.

FIG. 14F illustrates a model or scenario involving detection of lithology ahead of the bit.

Figure 14G:
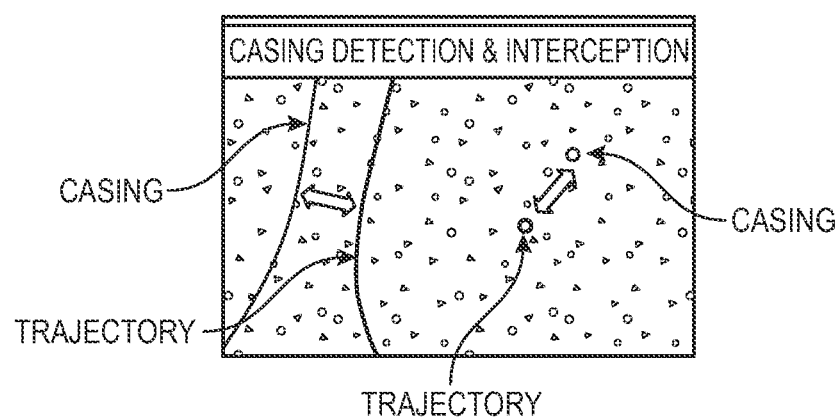
FIG. 14G illustrates a model or scenario involving casing detection and interception.

FIG. 14G illustrates a model or scenario involving casing detection and interception. This is usually used for avoidance.

It will be understood from the foregoing description that various modifications and changes may be made in the preferred and alternative embodiments of the present invention without departing from its true spirit. This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

The invention claimed is:

1. A method for directing borehole drilling in a target earth formation, comprising the steps of:
    providing drilling equipment having a bottom hole assembly that includes a controllable directional drilling subsystem, and a logging-while-drilling directional measurement tool with a look-around and look-ahead capability, wherein the look-around capability comprises registering a direction from which maximum conductivity can be measured;
    determining the presence of a predetermined type of formation characteristic in the target formation; and
    navigating a drill path in the target formation with said drilling equipment, including receiving measurement signals from said directional measurement tool, obtaining, from the received measurement signals, indications of formation parameters with respect to said formation characteristic in the target formation, and controlling said directional drilling subsystem to drill in a direction determined as a function of said obtained indication of formation parameters.

2. The method as defined by claim 1, wherein said step of providing a logging-while-drilling directional measurement tool comprises providing a logging-while-drilling directional resistivity measurement tool with a look-around or look-ahead capability.

3. The method as defined by claim 2, wherein said step of determining the presence of a predetermined type of formation characteristic in the target formation, comprises:
    storing, in a memory, a knowledge base comprising several representations of exemplary earth formation characteristic models;
    providing initial parameter data for said target formation; and
    comparing said initial parameter data with the models in said knowledge base to select a formation characteristic model, said predetermined type of formation characteristic in the target formation being derived from the selected formation characteristic model.

4. The method as defined by claim 3, wherein said step of storing, in a memory, a knowledge base comprising several representations of exemplary earth formation characteristic models comprises storing models that comprise sets of formation geometries and formation physical parameters.

5. The method as defined by claim 3, wherein said step of comparing said initial parameter data with said models comprises forward modeling said formation characteristic models, and comparing the results of said forward modelings with said initial parameter data.

6. The method as defined by claim 2, wherein said step of obtaining, from the received measurement signals, indications of formation parameters with respect to said formation characteristic in the target formation, comprises inverting said received measurement signals to obtain said indications of formation parameters with respect to said formation characteristic in the target formation.

7. The method as defined by claim 3, further comprising modifying the selected formation characteristic model in accordance with measurements received from said directional resistivity measurement tool.

8. A method for dynamically characterizing a target earth formation, comprising the steps of:
    providing drilling equipment having a bottom hole assembly that includes a controllable directional drilling subsystem, and a logging-while-drilling directional measurement tool with a look-around or look-ahead capability, wherein the look-around capability comprises registering a direction from which maximum conductivity can be measured;
    determining the presence of a predetermined type of formation characteristic in the target formation; and
    drilling in the target formation with said drilling equipment, receiving measurement signals from said directional measurement tool, and further characterizing the predetermined type of formation characteristic in the target formation based on the received measurement signals.

9. The method as defined by claim 8, wherein said step of providing a logging-while-drilling directional measurement tool comprises providing a logging-while-drilling directional resistivity measurement tool with a look-around and or look-ahead capability, and
    wherein said step of determining the presence of a predetermined type of formation characteristic in the target formation, comprises:
        storing, in a memory, a knowledge base comprising several representations of exemplary earth formation characteristic models;
        providing initial parameter data for said target formation; and comparing said initial parameter data with the models in said knowledge base to select a formation characteristic model, said predetermined type of formation characteristic in the target formation being derived from the selected formation characteristic model.

10. The method as defined by claim 9, wherein said step of storing, in a memory, a knowledge base comprising several representations of exemplary earth formation characteristic models comprises storing models that comprise sets of formation geometries and formation physical parameters.

11. The method as defined by claim 9, wherein said step of comparing said initial parameter data with said models comprises inverting the initial parameter data and comparing the results of said inversion with said models.

12. The method as defined by claim 9, wherein said step of comparing said initial parameter data with said models comprises forward modeling said formation characteristic models, and comparing the results of said forward modelings with said initial parameter data.

13. The method as defined by claim 8, wherein said step of providing a logging-while-drilling directional measurement tool comprises providing a logging-while-drilling directional resistivity measurement tool with a look-around and or look-ahead capability, and wherein said step of obtaining, from the received measurement signals, indications of formation parameters with respect to said formation characteristic in the target formation, comprises inverting said received measurement signals to obtain said indications of formation parameters with respect to said formation characteristic in the target formation.

14. A method for producing a borehole drilling plan in a target earth formation, comprising the steps of:
providing a memory;
storing, in said memory, a knowledge base comprising several representations of exemplary earth formation characteristic models;
providing initial parameter data for said target earth formation;
comparing said initial parameter data with the models in said knowledge base and selecting a model from said comparison; and
deriving a borehole drilling plan as a function of the selected model.

15. The method as defined by claim 14, wherein said step of deriving a borehole drilling plan comprises deriving a plot as a function of the selected model and of said initial parameter data.

16. The method as defined by claim 15, further comprising initiating borehole drilling in said target earth formation in accordance with said derived drilling plot.

17. The method as defined by claim 14, wherein said exemplary earth formation models comprise sets of formation parameters and wherein said step of comparing said initial parameter data with said models comprises forward modeling said sets of formation parameters, and comparing the results of said forward modelings with said initial parameter data.

18. The method as defined by claim 16, further comprising configuring a bottom hole assembly to include a directional drilling subsystem and a logging while drilling subsystem, and drilling in said target formation with a drill string having said configured bottom hole assembly.

19. The method as defined by claim 18, further comprising controlling drilling in said target formation as a function of said derived drilling plan and also as a function of parameters determined from LWD measurements.

20. The method as defined by claim 19, wherein said logging while drilling subsystem includes a directional resistivity measurement tool with a look-around or look-ahead capability.

* * * * *